US012006013B2

(12) United States Patent
Raper

(10) Patent No.: US 12,006,013 B2
(45) Date of Patent: Jun. 11, 2024

(54) LUBRICATING TOOL FOR BOAT STEERING CABLE

(71) Applicant: Jayce Raper, Leesburg, GA (US)

(72) Inventor: Jayce Raper, Leesburg, GA (US)

(*) Notice: Subject to any disclaimer, the term of this patent is extended or adjusted under 35 U.S.C. 154(b) by 0 days.

(21) Appl. No.: 18/058,500

(22) Filed: Nov. 23, 2022

(65) Prior Publication Data

US 2023/0159147 A1 May 25, 2023

Related U.S. Application Data

(60) Provisional application No. 63/282,410, filed on Nov. 23, 2021.

(51) Int. Cl.
 *B63H 20/12* (2006.01)
 *F16N 21/00* (2006.01)
 *B63H 20/00* (2006.01)

(52) U.S. Cl.
 CPC ............ *B63H 20/12* (2013.01); *F16N 21/00* (2013.01); *B63H 2020/008* (2013.01); *F16N 2210/06* (2013.01)

(58) Field of Classification Search
 CPC .... F16N 2210/34; F16N 3/10; F16N 2210/06; F16N 5/02; F16N 11/00; B63H 2020/008
 See application file for complete search history.

(56) References Cited

U.S. PATENT DOCUMENTS

| | | | | |
|---|---|---|---|---|
| 1,033,828 A | * | 7/1912 | Risser et al. | F16N 11/00 411/315 |
| 2,234,238 A | * | 3/1941 | Forsberg | F16N 21/02 184/105.3 |
| 3,565,213 A | * | 2/1971 | Heller | H02G 1/08 174/68.3 |
| 3,730,599 A | * | 5/1973 | Fingerle | F16C 33/6607 384/475 |
| 3,828,890 A | * | 8/1974 | Schott | D07B 7/12 184/105.1 |
| 4,422,529 A | * | 12/1983 | Johansen | B66D 1/28 184/15.1 |
| 4,545,461 A | * | 10/1985 | Dewyer | F16C 1/24 184/105.3 |
| 4,573,715 A | * | 3/1986 | Armbruster | H02G 3/06 405/184.5 |
| 4,595,080 A | * | 6/1986 | Shay | F16N 21/02 184/105.3 |

(Continued)

*Primary Examiner* — Michael A Riegelman
(74) *Attorney, Agent, or Firm* — Perilla Knox & Hildebrandt LLP; Jason M. Perilla

(57) ABSTRACT

Various examples of a tool for lubricating a boat steering cable are described, along with examples of using the tool. In one example, a tool for lubricating a boat steering cable includes a lubricator barrel and a threaded lubricator pin. The lubricator barrel includes an outer cylindrical surface, a first end surface, and a second end surface. The lubricator barrel also includes a central barrel cavity extending from the first end surface, along a longitudinal centerline of the lubricator barrel, and a pin cavity extending from the outer cylindrical surface to the central barrel cavity. In some cases, the lubricator barrel also includes a first o-ring seat, a second o-ring seat, or both. The first o-ring seat is positioned at one end of the central barrel cavity and the second o-ring seat is positioned at the outer cylindrical surface of the pin cavity.

20 Claims, 11 Drawing Sheets

(56) References Cited

U.S. PATENT DOCUMENTS

| | | | | |
|---|---|---|---|---|
| 4,738,151 | A | * | 4/1988 | Russell ................ F16D 1/0858 |
| | | | | 403/379.5 |
| 4,749,059 | A | * | 6/1988 | Jonnes ..................... F16N 7/12 |
| | | | | 118/DIG. 18 |
| 5,107,961 | A | * | 4/1992 | Schott .................... F16N 11/00 |
| | | | | 118/404 |
| 5,654,526 | A | * | 8/1997 | Sharp ....................... H02G 3/06 |
| | | | | 285/94 |
| 5,771,538 | A | * | 6/1998 | Huppert, Sr. ........... E05D 11/02 |
| | | | | 16/386 |
| 6,145,624 | A | * | 11/2000 | Tharpe ..................... F16C 1/24 |
| | | | | 184/105.3 |
| 9,638,235 | B2 | * | 5/2017 | Pain ..................... F16B 33/008 |
| 2010/0224015 | A1 | * | 9/2010 | Paxton ................. F16C 19/525 |
| | | | | 73/866.5 |
| 2012/0079683 | A1 | * | 4/2012 | Spragg ................... E05D 11/02 |
| | | | | 16/274 |
| 2017/0009796 | A1 | * | 1/2017 | Pain ..................... F16B 33/008 |
| 2021/0086988 | A1 | * | 3/2021 | Rose ....................... B65D 90/08 |
| 2023/0159147 | A1 | * | 5/2023 | Raper .................... B63H 20/12 |
| | | | | 184/105.3 |
| 2023/0405609 | A1 | * | 12/2023 | Olsson ..................... B04B 9/12 |

\* cited by examiner

LUBRICATING TOOL FOR BOAT STEERING CABLE

CROSS-REFERENCE TO RELATED APPLICATIONS

This application claims the benefit of and priority to U.S. Provisional Application No. 63/282,410, filed Nov. 23, 2021, and titled "LUBRICATING TOOL FOR BOAT STEERING CABLE," the entire contents of which are hereby incorporated herein by reference.

BACKGROUND

Boat steering cables are relied upon to mechanically couple the steering wheel of a boat to the inboard or outboard engine of the boat, to control the angle of the engine's propeller. Typically, outboard engines for boats are pivotably secured to the stern end of a boat using a motor or engine mount. Boat steering cables are relied upon to mechanically turn or pivot the outboard engines about a pivot point at the engine mount.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As noted above, boat steering cables are relied upon to mechanically couple the steering wheel of a boat to the inboard or outboard engine of the boat, to control the angle of the engine's propeller. Typically, outboard engines for boats are pivotably secured to the stern end of a boat using a motor or engine mount. Boat steering cables are relied upon to mechanically turn or pivot the outboard engines about a pivot point at the engine mount.

Boat steering cables include an outer sheath and an internal cable that extends within and through the outer sheath. Over time, a significant amount of friction can build up between the outer sheath and the internal cable, due to dirt, water, and other debris accumulating in the space between the outer sheath and the internal cable, making it difficult to steer the engine of the boat using the boat steering cable. The concepts described herein are directed to a tool that assists with the injection of a lubricant, such as a lubricating oil, between the outer sheath and an internal cable of a boat steering cable.

In the context outlined above, various examples of a tool for lubricating a boat steering cable are described, along with examples of using the tool. In one example, a tool for lubricating a boat steering cable includes a lubricator barrel and a threaded lubricator pin. The lubricator barrel includes an outer cylindrical surface, a first end surface, and a second end surface. The lubricator barrel also includes a central barrel cavity extending from the first end surface, along a longitudinal centerline of the lubricator barrel, and a pin cavity extending from the outer cylindrical surface to the central barrel cavity. In some cases, the lubricator barrel also includes a first o-ring seat, a second o-ring seat, or both. The first o-ring seat is positioned at one end of the central barrel cavity and the second o-ring seat is positioned at the outer cylindrical surface of the pin cavity.

The tool can also include a coupling for a grease gun, for example, or another applicator or injector of lubricant. A grease gun can be preferred for application or injection of a lubricant into the lubricator barrel of the tool because of the relatively high pressures that the grease gun is capable of. The lubricant is not limited to grease, however, as a lower viscosity lubricant can be used in the grease gun, such as oil. When injecting an oil into the lubricator barrel using a grease gun according to the embodiments and in the manner described herein, the oil can be pushed over nearly the full extent of a steering cable for a boat, such as from the engine at the stern of the boat to the helm of the boat.

Figure 1:
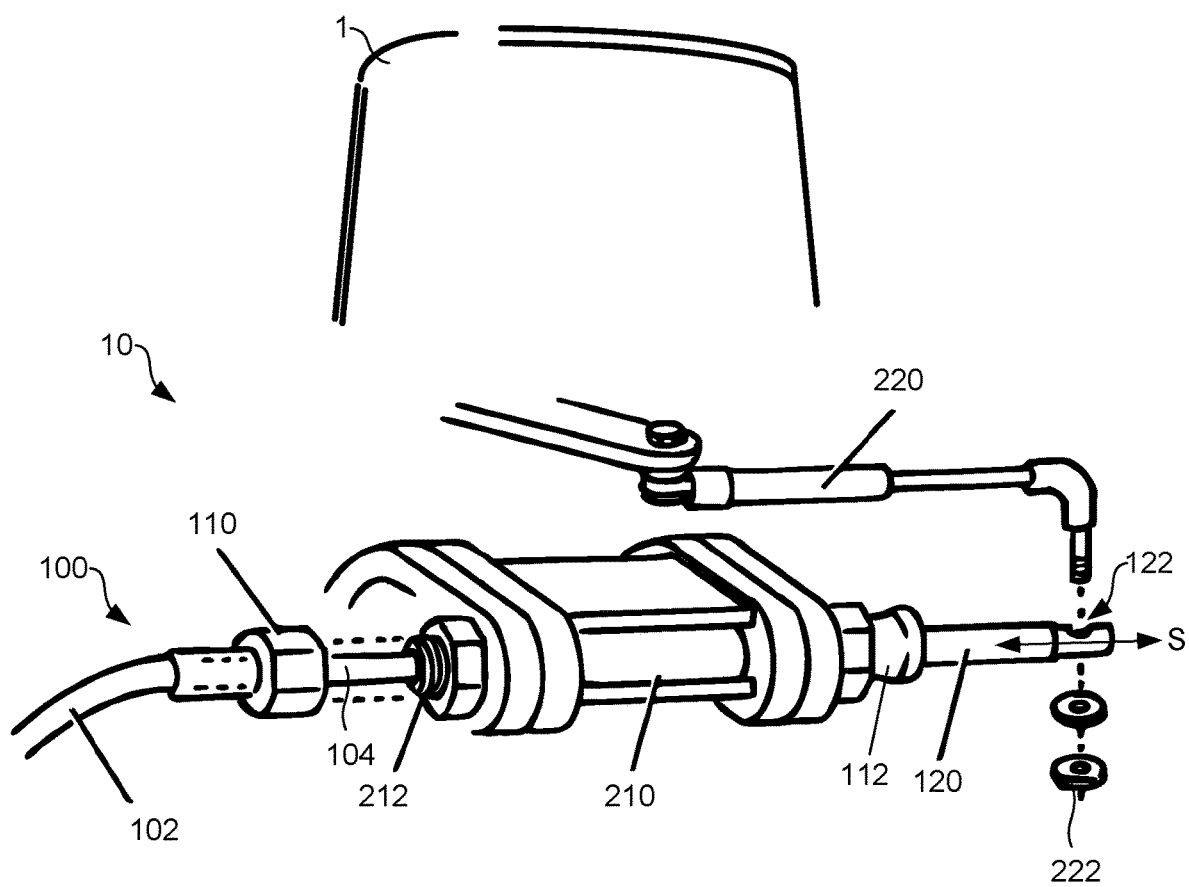
FIG. 1 illustrates an example mounting assembly for an outboard engine of a boat according to aspects of the embodiments described herein.

Turning to the drawings, FIG. 1 illustrates an example mounting assembly 10 for an outboard engine 1 of a boat (not shown) according to aspects of the embodiments described herein. The mounting assembly 10 includes a steering cable 100 for the boat. In the example shown, the steering cable 100 includes an outer sheath 102, an internal cable 104, a locking nut 110, and a steering rod 120 positioned at the distal end of the internal cable 104. The steering rod 120 includes a mounting aperture 122 at one end. The mounting assembly 10 also includes a tilt tube 210 of an engine mount of the engine 1.

The locking nut 110 secures the outer sheath 102 of the steering cable 100 to the tilt tube threads 212 at one side of the tilt tube 210. A coupler nut 112 is fitted around tilt tube threads (not visible) at another side of the tilt tube 210. The steering rod 120 of the steering cable 100 extends through a central opening in the tilt tube 210. A steering arm 220 of the engine 1 is coupled to one end of the steering rod 120. In the example shown, a curved end of the steering arm 220 extends through the mounting aperture 122 of the steering rod 120 and is secured in that position with a locking nut 222.

The steering cable 100 facilitates movement of the steering arm 220, which pivots the engine 1 to the left and to the right, as would be understood in the field. The steering cable 100 includes the outer sheath 102 and the internal cable 104 that extends within and through the outer sheath 102. Hidden from view within the tilt tube 210, the steering rod 120 of the steering cable 100 is secured to the distal end of the internal cable 104. At the other end of the steering cable 100 (not shown in FIG. 1), another distal end of the internal cable 104 can be mechanically coupled to the helm or steering wheel of the boat. As the helm is adjusted, the internal cable 104 is pushed and pulled within the outer sheath 102 of the steering cable 100, which ultimately moves the steering rod 120 in the direction "S" shown in FIG. 1. This movement, in turn, moves the steering arm 220 of the engine 1 and pivots the engine 1.

Over time, a significant amount of friction can build up between the outer sheath 102 and the internal cable 104, due to dirt, water, salt, rust, and other debris accumulating in the space between the outer sheath 102 and the internal cable 104. The accumulation of the debris can make it difficult to pivot the engine of the boat using the steering cable 100, primarily due to increased friction between the outer sheath 102 and the internal cable 104.

Figure 2A:
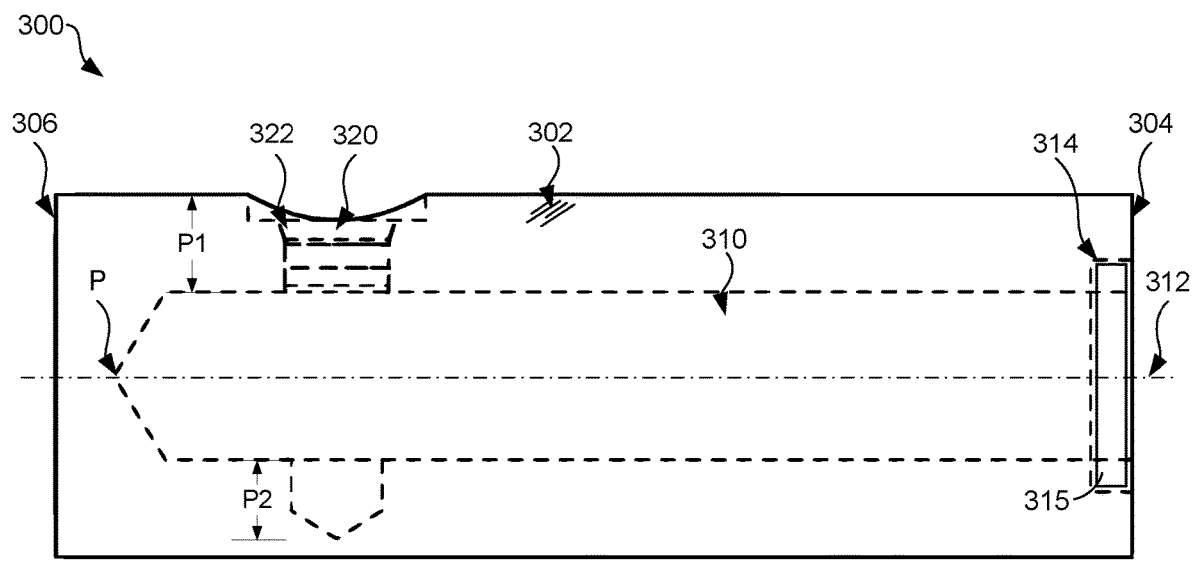
FIG. 2A illustrates a side view of a lubricator barrel of a tool for lubricating a boat steering cable according to aspects of the embodiments described herein.
Figure 2B:
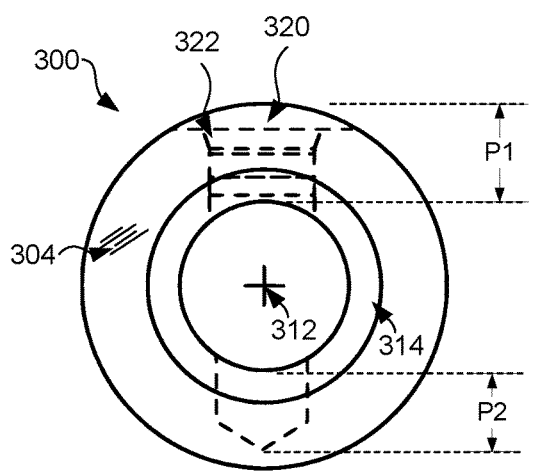
FIG. 2B illustrates an end view of the lubricator barrel of the tool shown in FIG. 2B according to aspects of the embodiments described herein.
Figure 2C:
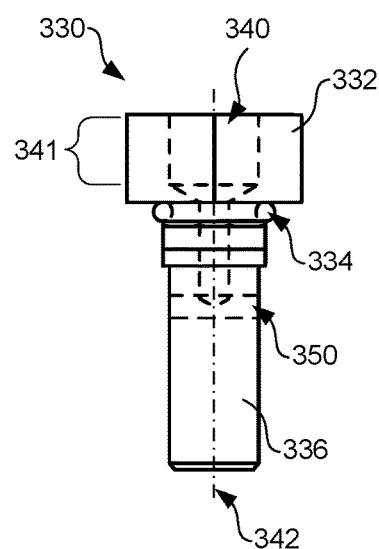
FIG. 2C illustrates a threaded lubricator pin of the tool for lubricating a boat steering cable according to aspects of the embodiments described herein.

FIG. 2A illustrates a side view of a lubricator barrel 300 of a tool for lubricating a boat steering cable according to aspects of the embodiments described herein. FIG. 2B illustrates an end view of the lubricator barrel 300 of the tool shown in FIG. 2B according to aspects of the embodiments described herein. FIG. 2C illustrates a threaded lubricator pin 330 of the tool for lubricating a boat steering cable according to aspects of the embodiments described herein. The lubricator barrel 300 is illustrated as a representative example in FIGS. 2A and 2B. The lubricator barrel 300 is not drawn to any particular size or scale in the example shown. In practice, the lubricator barrel 300 can vary to some extent in size and shape as compared to that shown. Similarly, the threaded lubricator pin 330 is illustrated as a representative example in FIG. 2C. The threaded lubricator pin 330 is not drawn to any particular size or scale in the example shown. In practice, the threaded lubricator pin 330 can vary to some extent in size and shape as compared to that shown.

Referring between FIGS. 2A and 2B, the lubricator barrel 300 includes an outer cylindrical surface 302, a first end surface 304, and a second end surface 306. The lubricator barrel 300 also includes a central barrel cavity 310. The central barrel cavity 310 is a cavity within the lubricator barrel 300. The central barrel cavity 310 extends from the first end surface 304 of the lubricator barrel 300, along a longitudinal centerline 312 of the lubricator barrel 300, to a position "P" within the lubricator barrel 300.

The lubricator barrel 300 also includes a pin cavity 320. The pin cavity 320 is also a cavity within the lubricator barrel 300. The pin cavity 320 extends from the outer cylindrical surface 302 of the lubricator barrel 300, through a first portion P1 of the lubricator barrel 300, towards the longitudinal centerline 312. The pin cavity 320 intersects with the central barrel cavity 310, inside the lubricator barrel 300, such that the central barrel cavity 310 and the pin cavity 320 are in fluid communication with each other. The pin cavity 320 also extends through a second portion P2 of the lubricator barrel 300, as shown in FIGS. 2A and 2B.

The pin cavity 320 can be threaded along at least a portion of its length. The threaded lubricator pin 330, as shown in FIG. 2C, can be inserted and threaded into the pin cavity 320, as described below. The lubricator barrel 300 also includes a first o-ring seat 314 at one end of the central barrel cavity 310. Referring between FIGS. 2A and 2B, the first o-ring seat 314 is a recessed ring surface. The o-ring seat 314 is a flat, circular, recessed surface, extending around the opening of the central barrel cavity 310. The o-ring seat 314 is recessed from the first end surface 304 of the lubricator barrel 300, along the longitudinal centerline 312. An o-ring 315 or other sealing member can be seated into the o-ring seat 314. In one example, a flat o-ring 315 formed of rubber can be relied upon, although other types and styles of o-rings can be used. The lubricator barrel 300 also includes a second o-ring seat 322. The second o-ring seat 322 is a flat, circular, recessed surface. The second o-ring seat 322 is recessed from the outer cylindrical surface 302 of the lubricator barrel 300.

FIG. 2C illustrates a threaded lubricator pin 330 of the tool for lubricating a boat steering cable. The threaded lubricator pin 330 includes a pin head 332, a pin o-ring 334, and a cylindrical pin rod 336. The cylindrical pin rod 336 can vary in size as compared to that shown. For example, the cylindrical pin rod 336 can be formed to have a smaller outer circumference as compared to that shown, in some cases, to facilitate easy insertion of the cylindrical pin rod 336 through the mounting aperture 122 of the steering rod 120. The pin rod 336 can also vary in length (i.e., from the top to the bottom of the page) as compared to that shown in some cases.

The threaded lubricator pin 330 also includes a central fluid-flow passageway 340 extending from the pin head 332, along a longitudinal centerline 342 of the threaded lubricator pin 330, to a position within the pin rod 336. The pin rod 336 can be threaded along at least a portion of a length of the pin rod 336, on an outer surface of the pin rod 336. For example, the pin rod 336 can be threaded in a region starting below the o-ring 344 and extending along a length of the pin rod 336 to a position above the ejection passageway 350, which is described below. The pin cavity 320 of the lubricator barrel 300 can also be threaded along at least a portion of its length, as noted above. The threading on the outer surface of the pin rod 336 can mate or match with the threading on the inner surface of the pin cavity 320. Thus, the threaded lubricator pin 330 can be inserted and threaded into the pin cavity 320. In other cases, one or both of the pin rod 336 and the pin cavity 320 can omit the threading or threaded surfaces.

The threaded lubricator pin 330 also includes a fluid-flow ejection passageway 350 extending perpendicular to the central fluid-flow passageway 340 and the longitudinal centerline 342, through the pin rod 336. The fluid-flow ejection passageway 350 intersects through or with the central fluid-flow passageway 340, such that the passageways 340 and 350 are in fluid communication with each other. In other cases, the threaded lubricator pin 330 can omit both the central fluid-flow passageway 340 and the fluid-flow ejection passageway 350, such as when the threaded lubricator pin 330 is used with the embodiment shown in FIG. 2D.

A coupling (see FIG. 4E) can be seated and secured to the top of the pin head 332, for connection of the lubricator pin 330 to a grease gun, for example. The coupling can extend, at least in part, within the central fluid-flow passageway 340. In one example, the inner surfaces of the central opening portion 341 can be threaded within the pin head 332, so that the coupling for the grease gun can be threaded into and secured, at least in part, within the central opening portion 341 of the threaded lubricator pin 330.

An inner surface of the pin cavity 320, within the lubricator barrel 300, can be threaded. The inner surface of the pin cavity 320 can be threaded along at least a portion of the length (i.e., measured from the top to the bottom of the page) of the pin cavity 320. Similarly, an outer surface of the pin rod 336 can be threaded, along at least a portion of the length of the pin rod 336. The threads on the inner surface of the pin cavity 320 match or compliment those on the outer surface of the pin rod 336, so that the threaded lubricator pin 330 can be inserted (e.g., threaded into) and secured within the pin cavity 320 of the lubricator barrel 300, to assemble the tool. The pin o-ring 334, which can be embodied as a rubber sealing member, will seat into the second o-ring seat 322 when the tool is assembled, to form a seal between the pin head 332 and the lubricator barrel 300.

The lubricator barrel 300 can be formed from any suitable materials. As one example, the lubricator barrel 300 can be machined out of aluminum, although the lubricator barrel 300 can also be formed out of other metals or metal alloys. The lubricator barrel 300 can also be molded, at least in part, from metal and, in some cases, molded in part and machined in part. In other cases, the lubricator barrel 300 can be molded, in whole or in part, out of a plastic or polymer. The lubricator barrel 300 can also be molded, at least in part, from plastic and, machined to some extent after molding. Similarly, the threaded lubricator pin 330 can be machined out of aluminum, although the threaded lubricator pin 330 can also be formed out of other metals or metal alloys. The threaded lubricator pin 330 can also be molded in part and machined in part from a metal. In other cases, the threaded lubricator pin 330 can be molded, in whole or in part, out of a plastic or polymer. The threaded lubricator pin 330 can also be molded, at least in part, from plastic and machined to some extent after molding.

Figure 2D:
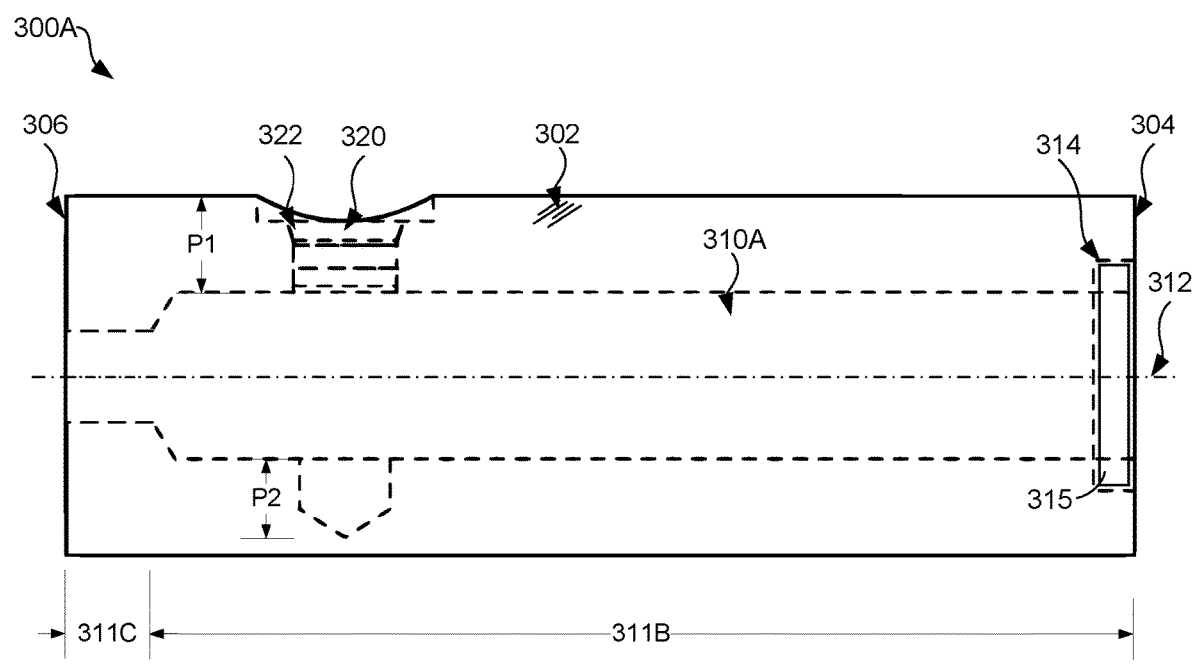
FIG. 2D illustrates another lubricator barrel of a tool for lubricating a boat steering cable according to aspects of the embodiments described herein.

In another example, FIG. 2D illustrates another lubricator barrel 300A of a tool for lubricating a boat steering cable according to aspects of the embodiments described herein. As compared to the lubricator barrel 300 shown in FIG. 2A, the central barrel cavity 310A of the lubricator barrel 300A shown in FIG. 2D is different than the central barrel cavity 310 of the lubricator barrel 300. The central barrel cavity 310A extends from the first end surface 304 to the second end surface 306. The central barrel cavity 310A also includes a first barrel length 311B and a second barrel length 311C. The first barrel length 311B is formed to have a larger diameter than the second barrel length 311C.

At least a portion of the inner surface of the second barrel length 311C can be threaded. In one example, at least a portion of the inner surfaces of the second barrel length 311C can be threaded, so that a coupling for the grease gun can be threaded into and secured, at least in part, within the second barrel length 311C of the lubricator barrel 300A.

The lubricator barrel 300A can be used with the threaded lubricator pin 330 shown in FIG. 2C. However, the threaded lubricator pin 330 can omit the central fluid-flow passageway 340 and the fluid-flow ejection passageway 350. Instead of injecting lubricant through the threaded lubricator pin 330, lubricant can be injected into the lubricator barrel 300A through a coupling for a grease gun, for example, that is fitted and secured within the second barrel length 311C of the lubricator barrel 300A.

Figure 3:
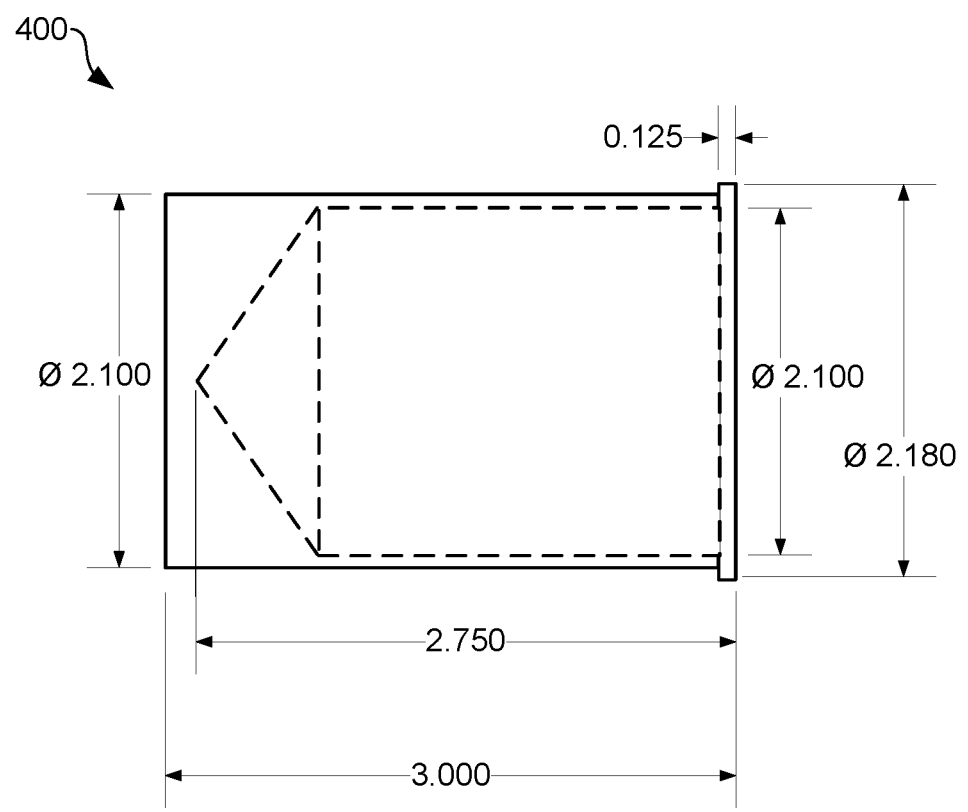
FIG. 3 illustrates an example cup for a grease gun, with example dimensions, according to according to aspects of the embodiments described herein.

FIG. 3 illustrates an example cup 400 for a grease gun, according to aspects of the embodiments described herein. The cup can be inserted into a grease gun, for example, for holding a lubricant for injection into the tool shown in FIGS. 2A-2C. The cup 400 is illustrated as a representative example in FIG. 3. Although example dimensions are shown in FIG. 3, the cup 400 can vary in size as compared to that shown.

FIGS. 4A-4F illustrate steps in an example method for lubricating a boat steering cable using the tool shown in FIGS. 2A-2C according to aspects of the embodiments described herein. The illustrations in FIGS. 4A-4F are representative and used to provide context for the method described. The features illustrated are not drawn to scale. Thus, the lubricating tool illustrated in FIGS. 4A-4F is not drawn to scale, and the features of the outboard engine are also not drawn to any particular scale. Additionally, although the example below is described in connection with the lubricator barrel 300 shown in FIG. 2A, the lubricator barrel 300A shown in FIG. 2D can also be used in a similar way, as would be appreciated by a person of skill in the art.

Figure 4A:
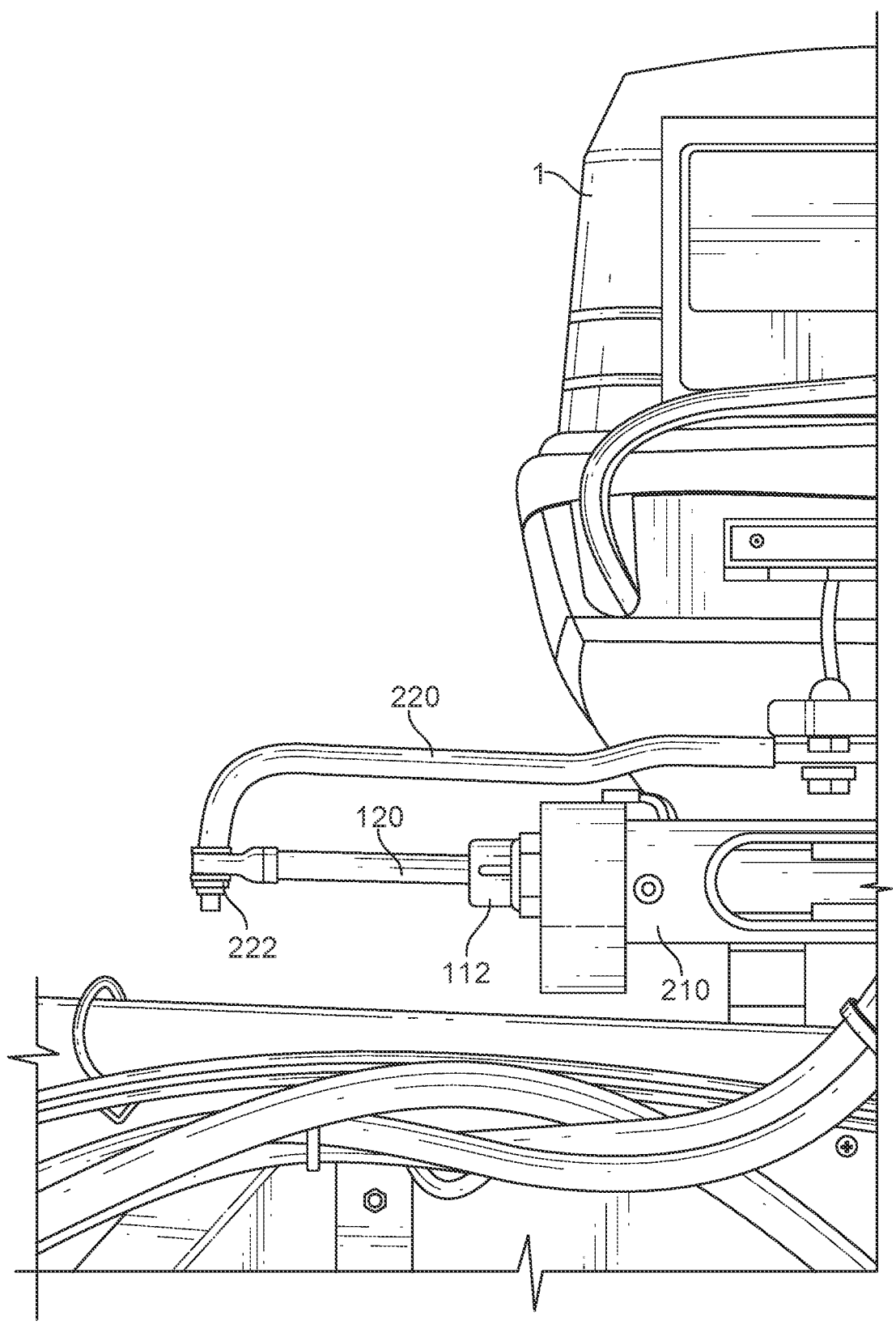
FIGS. 4A-4F illustrate steps in an example method for lubricating a boat steering cable according to aspects of the embodiments described herein.

As shown in FIG. 4A, the coupler nut 112 is fitted around tilt tube threads (see FIG. 4B) at one side of the tilt tube 210. The steering rod 120 of the steering cable 100 extends through a central opening in the tilt tube 210. The steering arm 220 of the engine 1 is coupled to one end of the steering rod 120. In the example shown, a curved end of the steering arm 220 extends through a mounting aperture 122 (see FIG. 1 and FIG. 4B) of the steering rod 120 and is secured in that position with the locking nut 222.

Figure 4B:
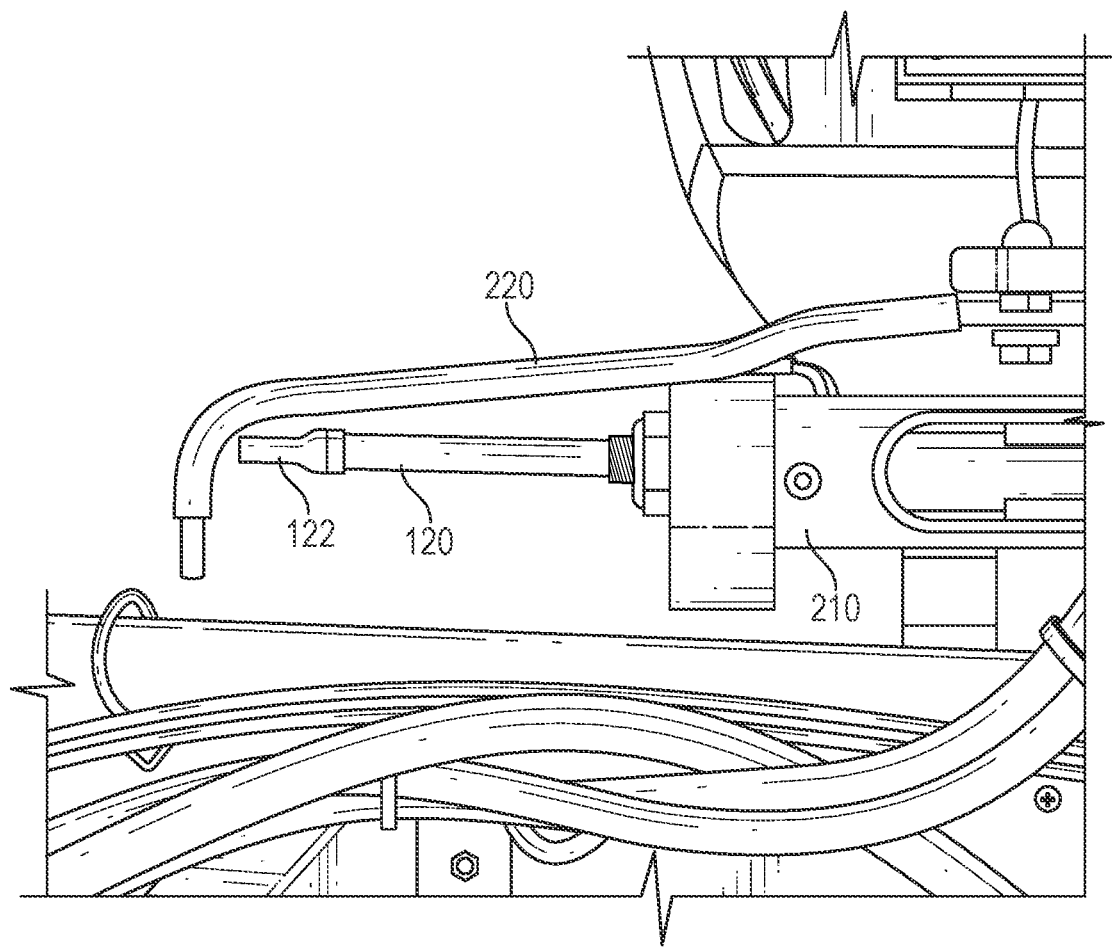
Figure 4C:
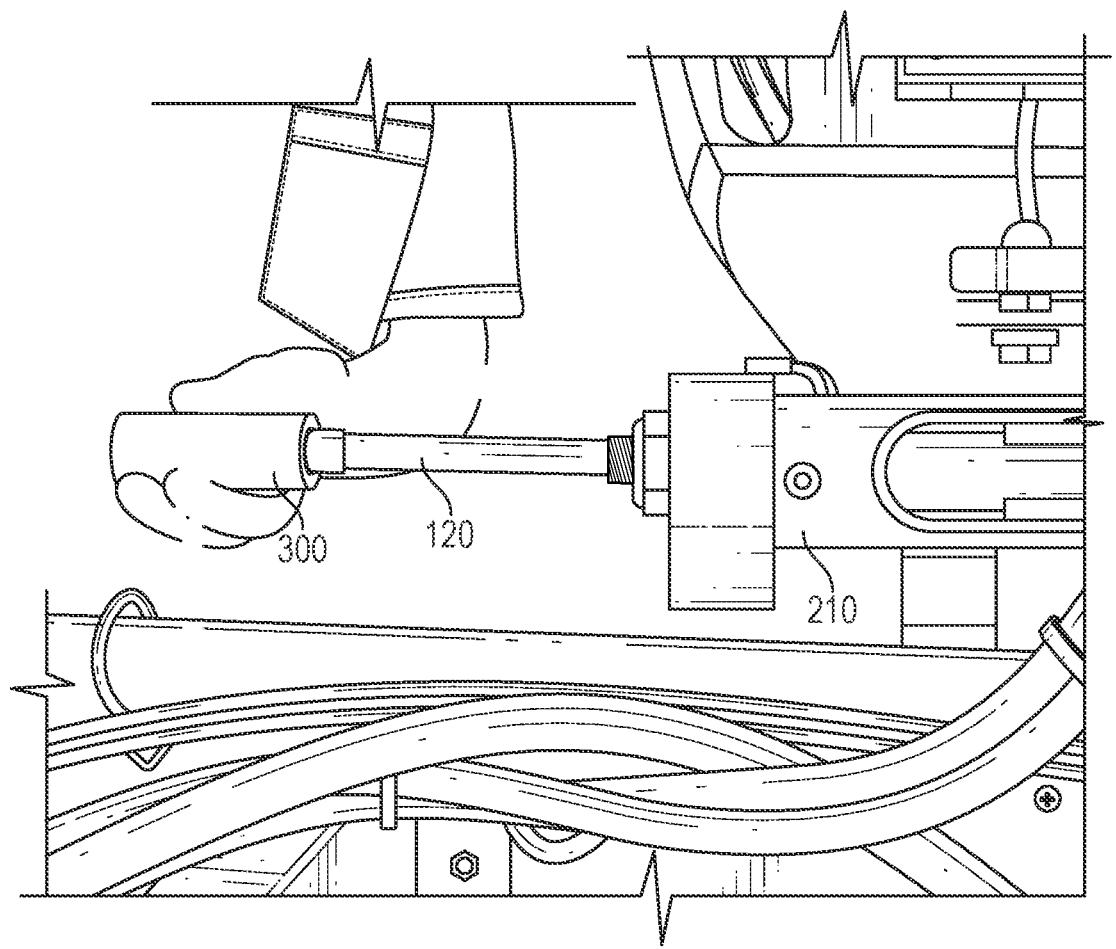

As shown in FIG. 4B, the locking nut 222 can be removed, and the coupler nut 112 can also be removed from around the steering rod 120. Turning to FIG. 4C, the lubricator barrel 300 can then be positioned around and over the steering rod 120 of the steering cable 100. Particularly, the steering rod 120 can be inserted into the central barrel cavity 310 of the lubricator barrel 300.

Figure 4D:
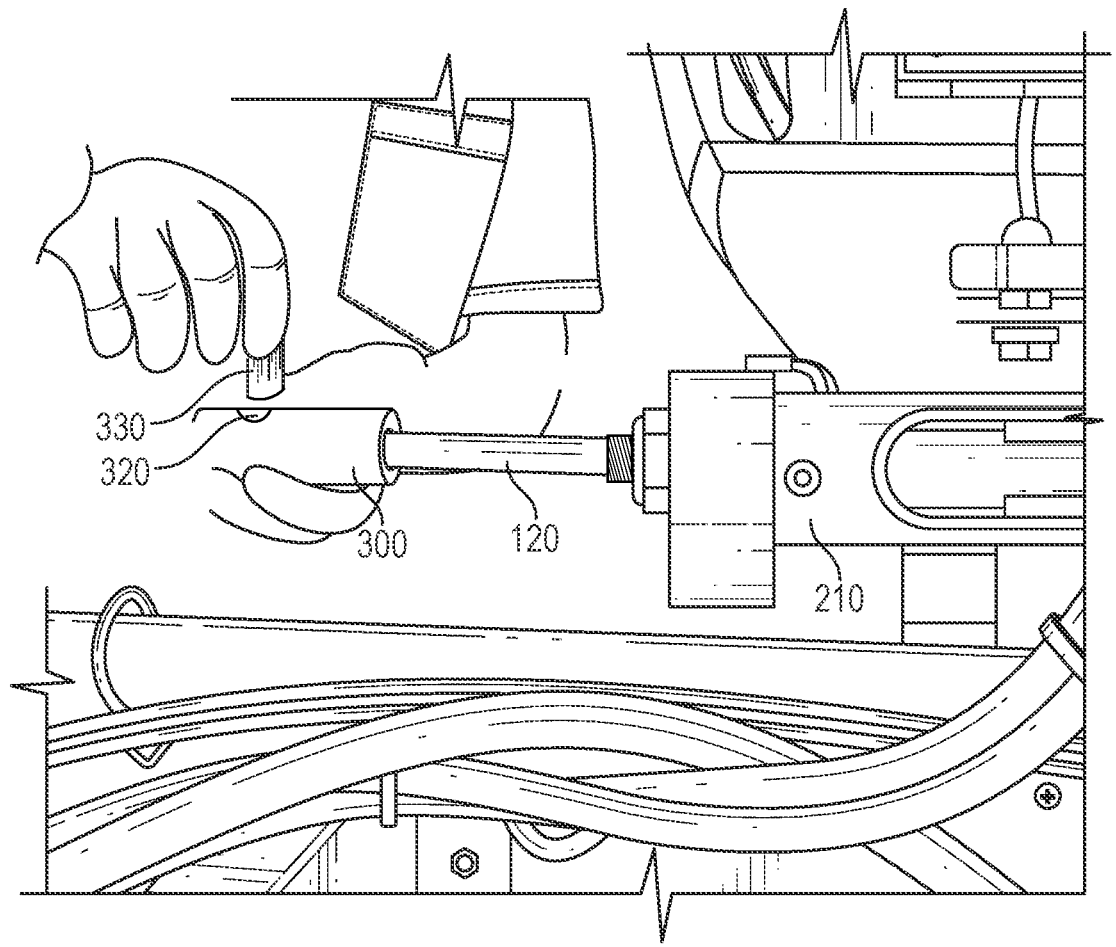
Figure 4E:
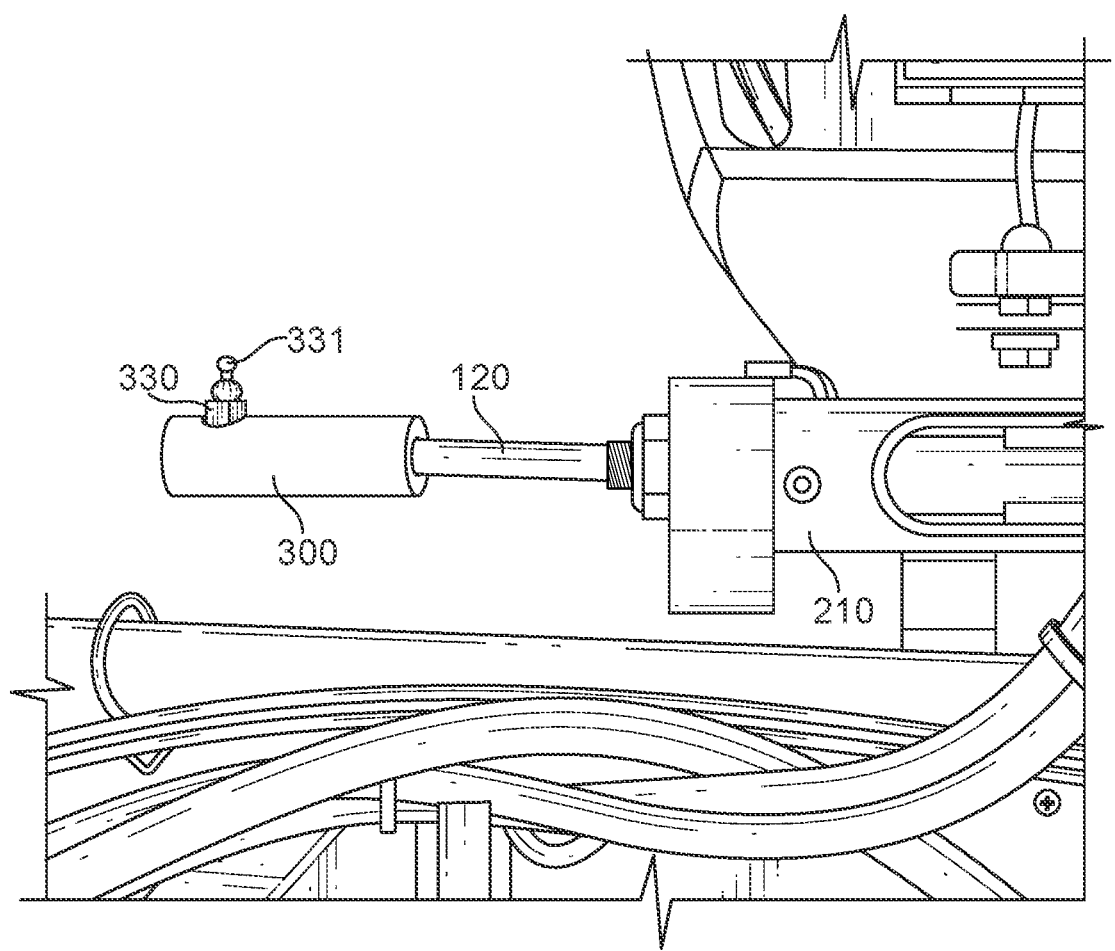

Turning to FIG. 4D, the threaded lubricator pin 330 can be inserted into the pin cavity 320 of the lubricator barrel 300, through the mounting aperture 122 (see also FIG. 4C) of the steering rod 120 (which is inside the central barrel cavity 310), and secured within the pin cavity 320, as shown in FIGS. 4D and 4E. In FIG. 4E, the coupling 331 at the top of the threaded lubricator pin 330 is also shown. The coupling 331 is threaded and secured into the central opening portion 341 of the threaded lubricator pin 330, as described above, for connecting the threaded lubricator pin 330 to grease gun.

Figure 4F:
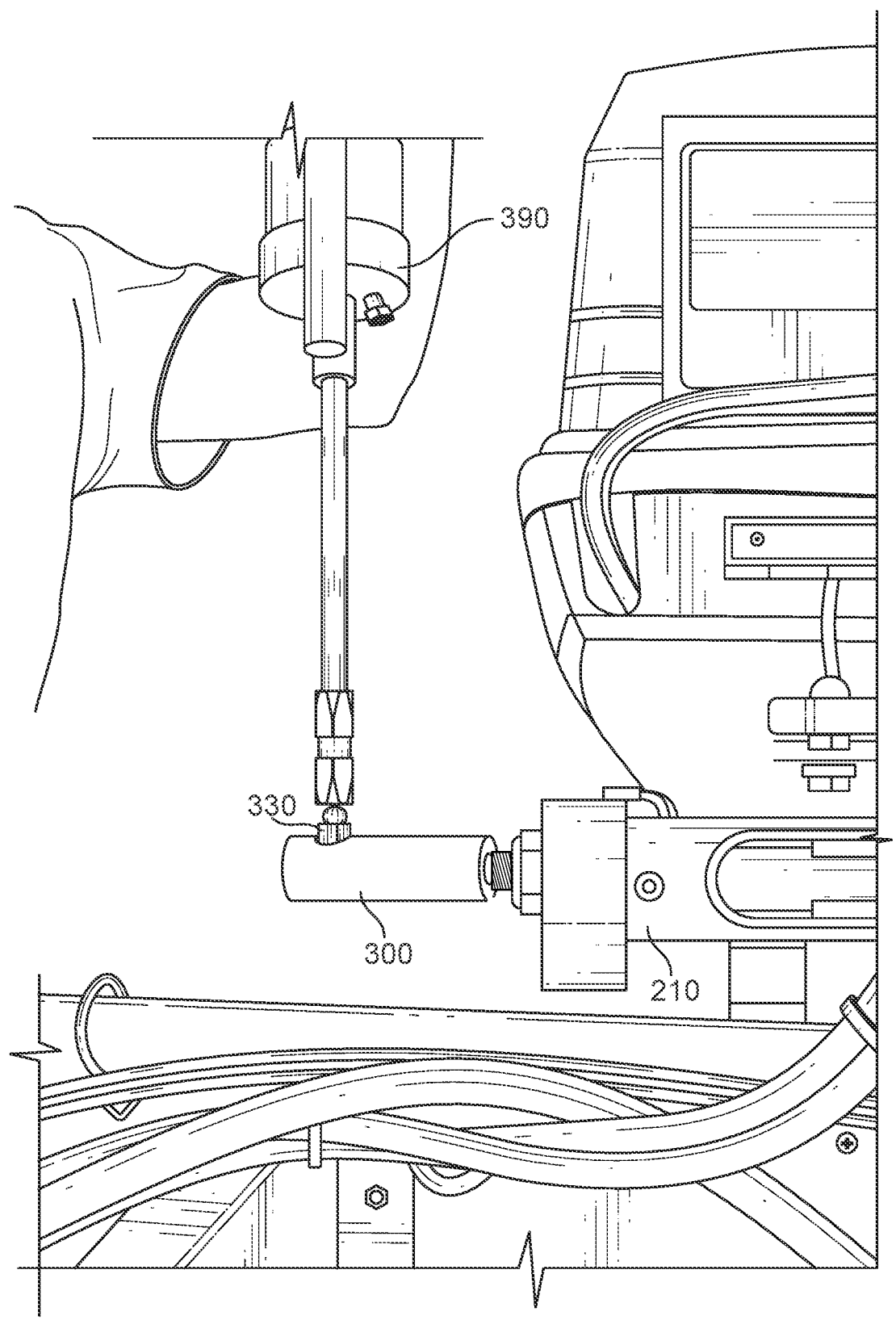

The lubricator barrel 300 can then be pressed against the tilt tube 210 as shown in FIG. 4F. Additionally, if needed, the helm of the boat can be adjusted to some extent, to help pull and hold the lubricator barrel 300 tightly against the side of the tilt tube 210, as also shown in FIG. 4F. For example, the helm of the boat can be adjusted to pull the steering rod 120 into the tilt tube 210, rather than extending it further out from inside the tilt tube 210. Because the threaded lubricator pin 330 is extended through and secured with the mounting aperture 122 (see also FIG. 4C) of the steering rod 120, both the threaded lubricator pin 330 and the lubricator barrel 300 will be pulled towards and against the side of the tilt tube 210, along with the steering rod 120. In that position, the o-ring 315 of the lubricator barrel 300 (see FIG. 2A) can be pressed against the side of the tilt tube 210, helping to seal the lubricator barrel 300 with the side of the tilt tube 210, in compression.

A grease gun 390 or similar tool can be connected to the coupling 331, as shown in FIG. 4F, and a lubricant can be manually injected into the threaded lubricator pin 330 using the grease gun 390. The lubricant (e.g., grease, oil, etc.) will pass into the threaded lubricator pin 330, through the fluid-flow ejection passageway 350 (see FIG. 2C) of the threaded lubricator pin 330, and into the central barrel cavity 310 of the lubricator barrel 300. The lubricant will extend within the central barrel cavity 310 and around the steering rod 120 within the central barrel cavity 310 of the lubricator barrel 300. The lubricant will also pass into the center of the tilt tube 210 and into the steering cable 100, lubricating it internally.

Figure 5:
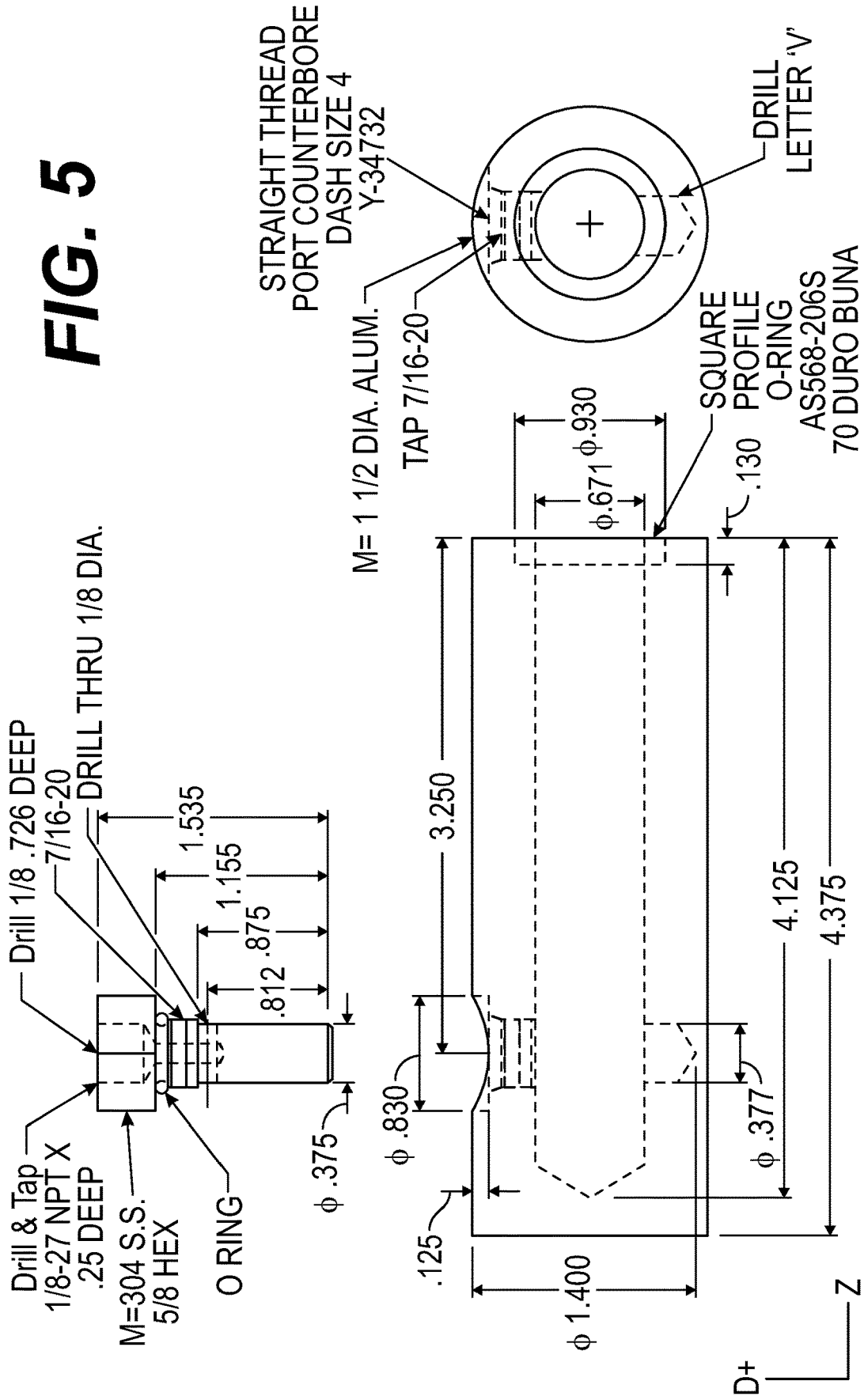
FIG. 5 illustrates example dimensions of the tool shown in FIGS. 2A-2C.

FIG. 5 illustrates example dimensions and tooling suggestions for the tool shown in FIGS. 2A-2C. The dimensions shown in FIG. 5 are provided as one example, but the embodiments described herein are not limited to any particular size. In practice, the size and feature dimensions of the tool shown in FIG. 5 and described herein can vary based on the size and dimensions of the steering cable being used, as one factor. Additionally, the size and feature dimensions of the tool shown in FIG. 5 are part of one example design and subject to manufacturing variances and related tolerances.

Terms such as "top," "bottom," "side," "front," "back," "right," and "left" are not intended to provide an absolute frame of reference. Rather, the terms are relative and are intended to identify certain features in relation to each other, as the orientation of structures described herein can vary. The terms "comprising," "including," "having," and the like are synonymous, are used in an open-ended fashion, and do not exclude additional elements, features, acts, operations, and so forth. Also, the term "or" is used in its inclusive sense, and not in its exclusive sense, so that when used, for example, to connect a list of elements, the term "or" means one, some, or all of the elements in the list.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included.

The terms "about" and "substantially," unless otherwise defined herein to be associated with a particular range, percentage, or related metric of deviation, account for at least some manufacturing tolerances between a theoretical design and manufactured product or assembly, such as the geometric dimensioning and tolerancing criteria described in the American Society of Mechanical Engineers (ASME®) Y14.5 and the related International Organization for Standardization (ISO®) standards. Such manufacturing tolerances are still contemplated, as one of ordinary skill in the art would appreciate, although "about," "substantially," or related terms are not expressly referenced, even in connection with the use of theoretical terms, such as the geometric "perpendicular," "orthogonal," "vertex," "collinear," "coplanar," and other terms.

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

The invention claimed is:

1. A tool for lubricating a boat steering cable, comprising:
a lubricator barrel comprising an outer cylindrical surface, a first end surface, and a second end surface, the lubricator barrel further comprising:
 a central barrel cavity extending from the first end surface of the lubricator barrel, along a longitudinal centerline of the lubricator barrel; and
 a pin cavity extending from the outer cylindrical surface of the lubricator barrel, towards the longitudinal centerline, and intersecting through the central barrel cavity; and
a threaded lubricator pin, the threaded lubricator pin comprising a pin head and a pin rod.

2. The tool according to claim 1, wherein the lubricator barrel further comprises a first o-ring seat at one end of the central barrel cavity at the first end surface of the lubricator barrel.

3. The tool according to claim 2, wherein the lubricator barrel further comprises a second o-ring seat in the pin cavity.

4. The tool according to claim 1, wherein the threaded lubricator pin further comprises:
a central fluid-flow passageway extending from the pin head, along a longitudinal centerline of the threaded lubricator pin, to a position within the pin rod.

5. The tool according to claim 4, wherein the threaded lubricator pin further comprises:
a fluid-flow ejection passageway extending perpendicular to the central fluid-flow passageway, through the pin rod, and intersecting through the central fluid-flow passageway.

6. The tool according to claim 1, wherein:
the threaded lubricator pin further comprises threads along at least a length of an outer surface of the pin rod; and
the pin cavity of the lubricator barrel further comprises threads along at least a length of an inner surface of the pin cavity.

7. The tool according to claim 1, wherein the threaded lubricator pin further comprises a threaded central opening portion within the pin head.

8. The tool according to claim 7, wherein the threaded lubricator pin further comprises a coupling for a grease gun secured within the threaded central opening portion of the pin head.

9. The tool according to claim 1, wherein the threaded lubricator pin further comprises an o-ring.

10. The tool according to claim 1, wherein:
the central barrel cavity extends from the first end surface of the lubricator barrel, along a longitudinal centerline of the lubricator barrel, through the second end surface of the lubricator barrel;
the central barrel cavity comprises first barrel length and a second barrel length;
the first barrel length is formed to have a larger diameter than the second barrel length; and
at least a portion of the second barrel length is threaded for a coupling.

11. The tool according to claim 10, wherein the lubricator barrel further comprises an o-ring seated in a recess.

12. A tool for lubricating a boat steering cable, comprising:
a lubricator barrel comprising:
 a central barrel cavity extending from a first end surface of the lubricator barrel, along a longitudinal centerline of the lubricator barrel, to a position within the lubricator barrel; and
 a pin cavity extending from an outer cylindrical surface of the lubricator barrel, towards the longitudinal centerline, and intersecting through the central barrel cavity; and
a threaded lubricator pin comprising a pin head and a pin rod.

13. The tool according to claim 12, wherein the threaded lubricator pin further comprises:
a central fluid-flow passageway extending from the pin head, along a longitudinal centerline of the threaded lubricator pin, to a position within the pin rod.

14. The tool according to claim 13, wherein the threaded lubricator pin further comprises:

a fluid-flow ejection passageway extending perpendicular to the central fluid-flow passageway, through the pin rod, and intersecting through the central fluid-flow passageway.

15. The tool according to claim 12, wherein:

the threaded lubricator pin further comprises threads along at least a length of an outer surface of the pin rod; and the pin cavity of the lubricator barrel further comprises threads along at least a length of an inner surface of the pin cavity.

16. The tool according to claim 12, wherein the threaded lubricator pin further comprises a threaded central opening portion within the pin head.

17. The tool according to claim 16, wherein the threaded lubricator pin further comprises a coupling for a grease gun secured within the threaded central opening portion of the pin head.

18. A tool for lubricating a boat steering cable, comprising:

a lubricator barrel comprising:
a central barrel cavity extending from a first end surface of the lubricator barrel, along a longitudinal centerline of the lubricator barrel, to a position within the lubricator barrel; and
a pin cavity extending from an outer cylindrical surface of the lubricator barrel, towards the longitudinal centerline, and intersecting through the central barrel cavity; and a threaded lubricator pin comprising a pin head and a pin rod, the threaded lubricator pin comprising:
a central fluid-flow passageway extending from the pin head, along a longitudinal centerline of the threaded lubricator pin, to a position within the pin rod; and
a fluid-flow ejection passageway extending perpendicular to the central fluid-flow passageway, through the pin rod, and intersecting through the central fluid-flow passageway.

19. The tool according to claim 18, wherein the threaded lubricator pin further comprises a threaded central opening portion within the pin head.

20. The tool according to claim 19, wherein the threaded lubricator pin further comprises a coupling for a grease gun secured within the threaded central opening portion of the pin head.

* * * * *